Aug. 13, 1963 R. S. LOWENSOHN 3,100,384
TRAILER REFRIGERATION APPARATUS
Filed Nov. 30, 1960 4 Sheets-Sheet 1
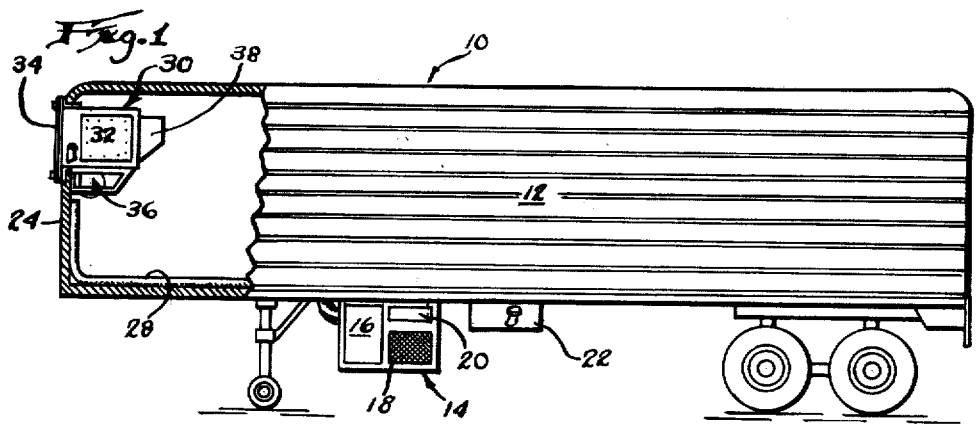
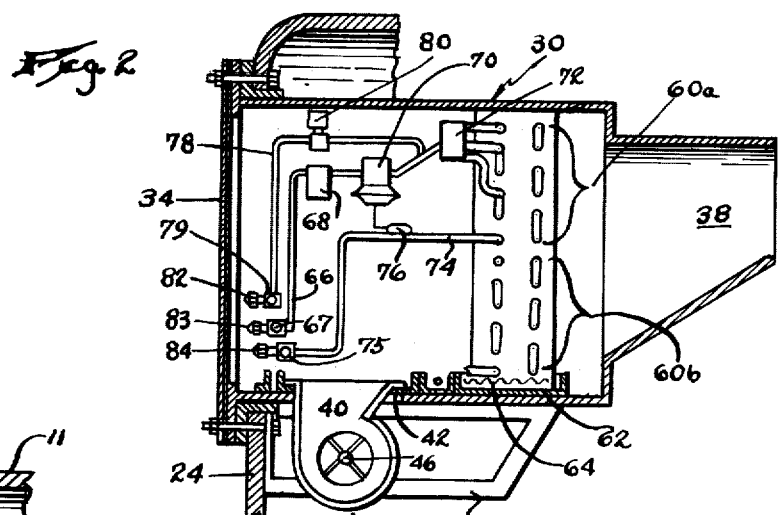
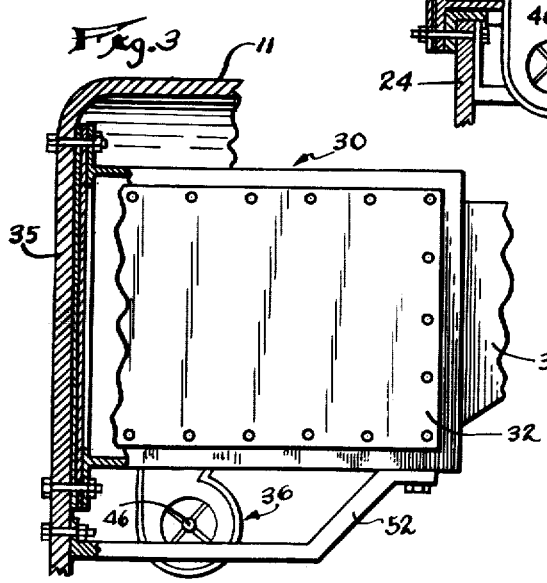
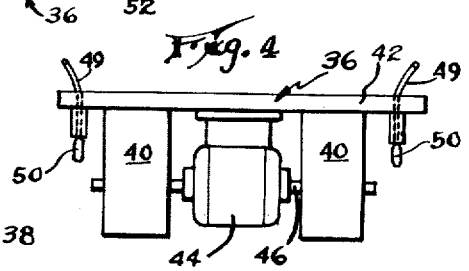
INVENTOR.
RALPH S. LOWENSOHN,
BY
ATTORNEYS.

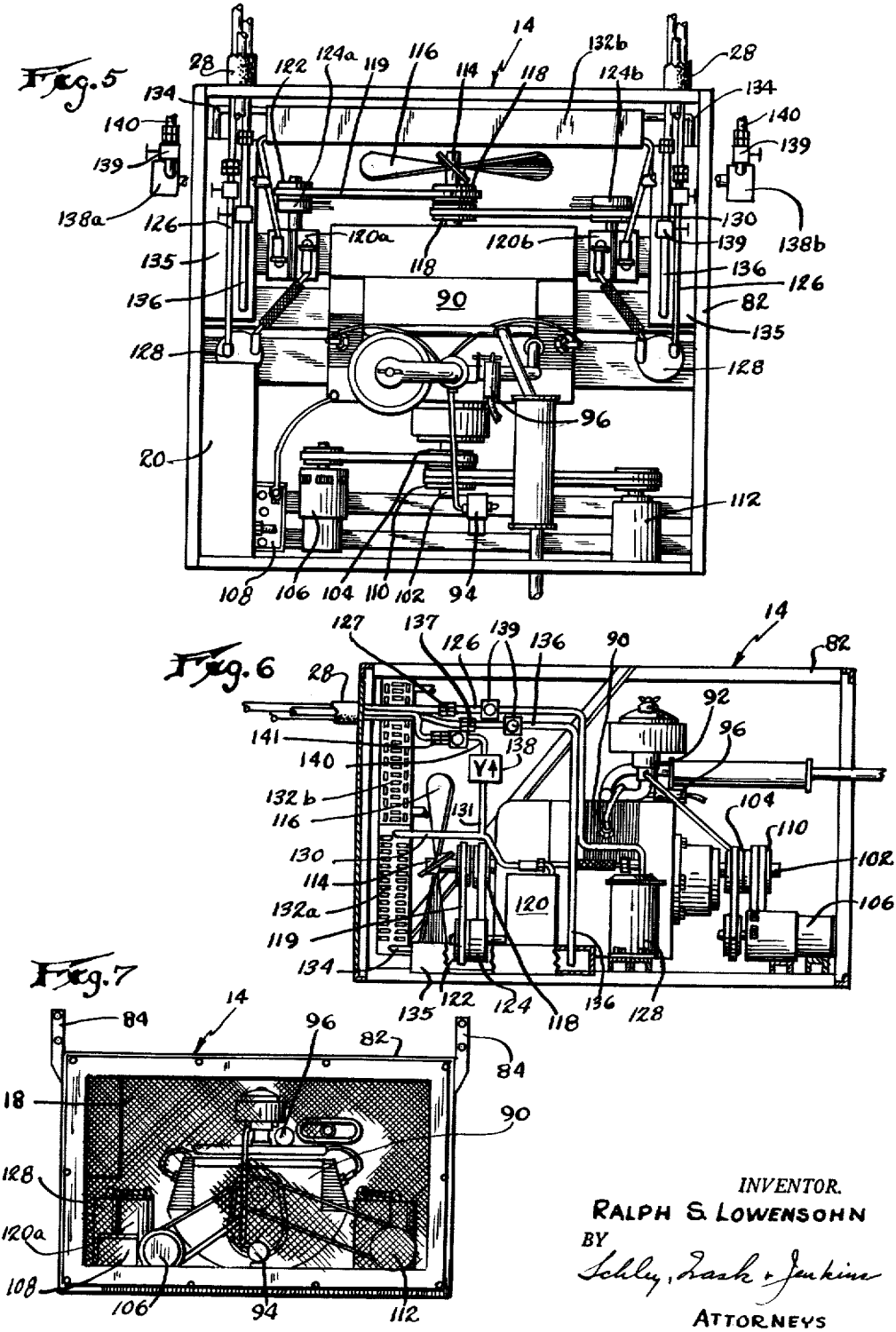

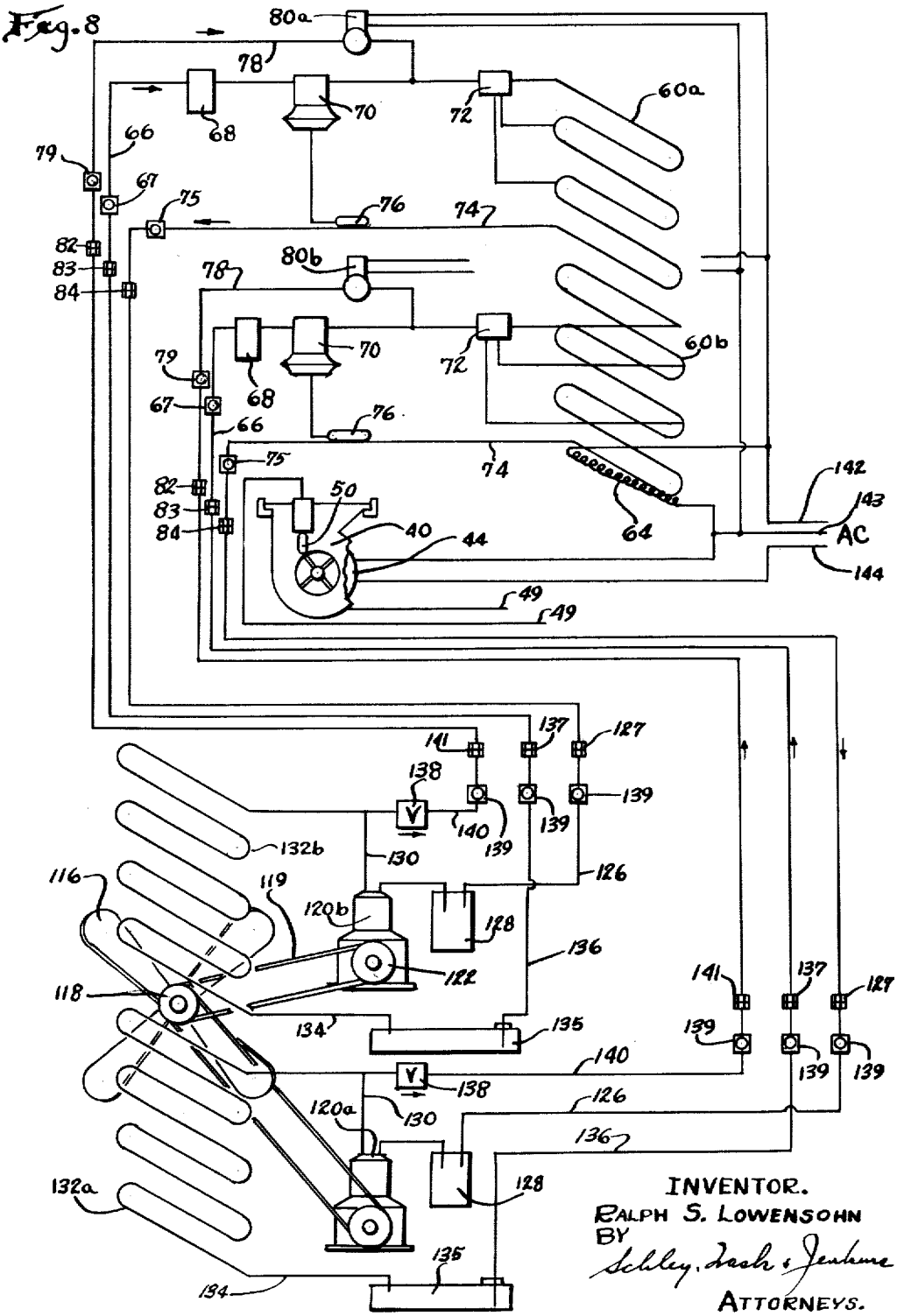

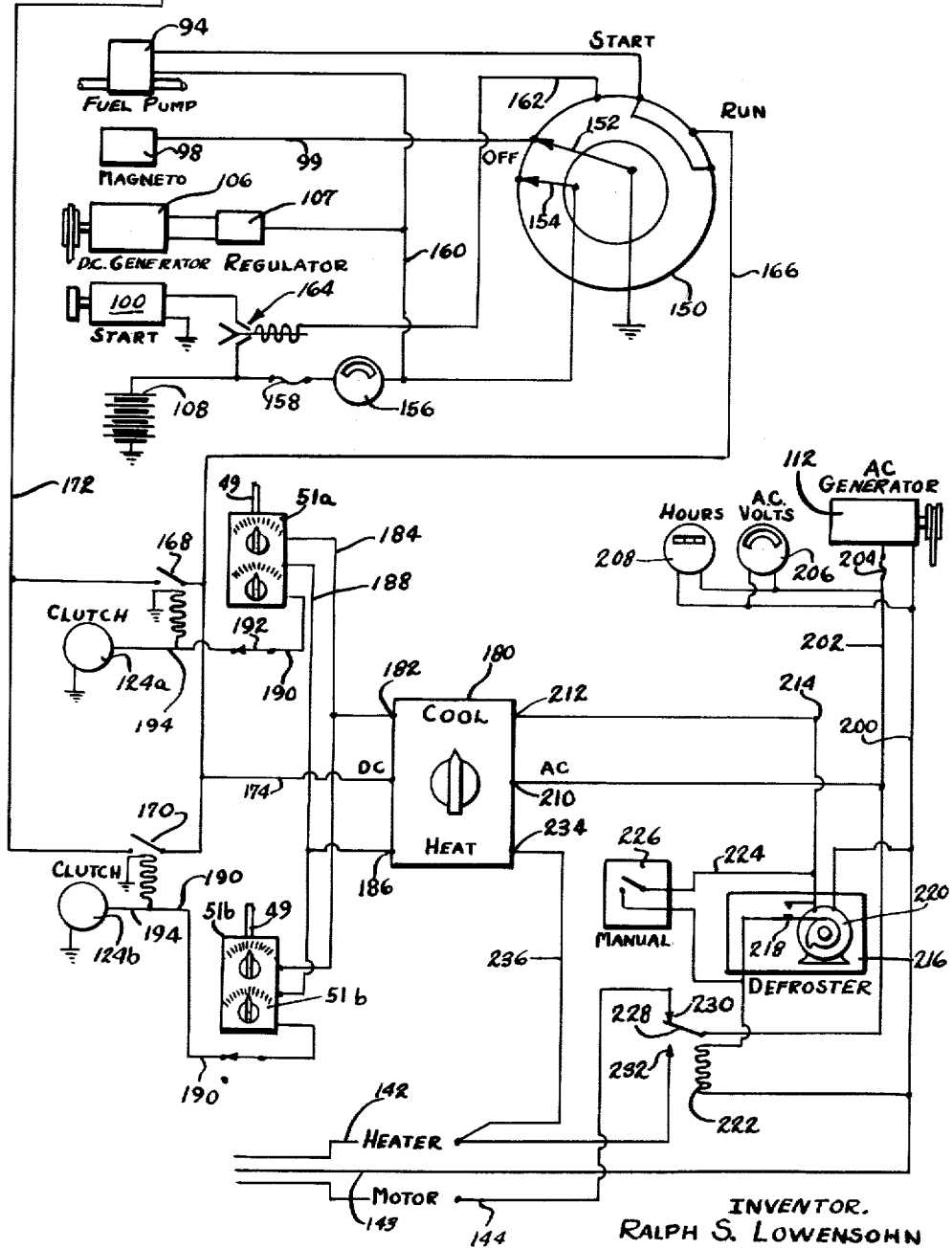

United States Patent Office 3,100,384
Patented Aug. 13, 1963

3,100,384
TRAILER REFRIGERATION APPARATUS
Ralph S. Lowensohn, Indianapolis, Ind., assignor to Flextemp Corporation, Indianapolis, Ind., a corporation of Indiana
Filed Nov. 30, 1960, Ser. No. 72,664
12 Claims. (Cl. 62—156)

This invention relates to refrigeration apparatus for transport vehicles such as trucks, and especially refrigeration apparatus for semi-trailers, which will not only provide cooling but will also provide certain heating functions.

It is the principal object of the invention to provide improved refrigeration apparatus, especially for truck units such as trailers and especially semi-trailers, which will be self-contained on the trailer unit so that it is independent of any outside power supply, either from the truck tractor by which it is drawn or otherwise, which will be simple and convenient to install and will require minimum modification of the trailer unit, which will provide high refrigeration capacity and especially a high degree of reliability, which will provide dual refrigeration systems in the same installation which may be operated jointly under a common control system or may be operated individually and either of which will be adequate to maintain safe refrigeration conditions in the event of any failure of one of the systems. It is a further object of the invention to provide refrigeration apparatus made up of standard components, for example, of standard automotive or standard electrical appliance components of high reliability characteristics and for which service facilities are widely available, and to arrange such components in the apparatus in a manner which provides for easy service accessibility. It is a further object of the invention to provide refrigeration apparatus for vehicles such as semi-trailers in which the parts are arranged in a desirable weight distribution and will occupy a minimum of load space, and to this end, to mount on the truck walls and in its load space only the minimum apparatus required for the purpose, that is, only the evaporator and the blower and their necessary controls, and to mount below and directly from the frame of the truck trailer the other heavier parts of the system, including the prime mover, the compressor and condenser units, etc. It is a further object of the invention to provide a dual refrigeration system which will embody flexible operation and which will provide operation either at high capacity or at normal maintenance capacity, which will provide adequate defrosting controls, and which can be readily converted to provide sufficient heating for normal requirements.

In accordance with the invention as applied to a semi-trailer, a power section is mounted on the trailer beneath the frame of such trailer and directly supported from such frame, so that it imposes no stress on the body walls of the trailer and requires no loading space. Such power section includes a prime mover, such as a gasoline engine, and the compressor and condenser sections of two parallel or dual refrigeration systems, both powered by the gasoline engine through independently controlled electric clutches. The power section also includes the various engine accessories, such as the fuel pump, magneto, battery, generator, and starter, and also includes a generator, preferably an A.C. generator, driven by the prime mover for generating power for operating the blower and heater of the evaporator section. The power section also includes a control panel, readily accessible from the ground, which provides controls for the entire refrigeration and engine apparatus.

In further accordance with the invention as applied to a trailer, an evaporator-blower section is mounted on the trailer body, conveniently in the front wall or nose portion of the trailer, and such section contains evaporators for the dual refrigeration systems, a blower and its drive motor, and the necessary evaporator control elements, including a solenoid valve for connecting the evaporator direct to the hot gas line from the compressor. The evaporator-blower section also includes an electric resistance heater coil for defrosting and for supplying heat in the heating functions of the apparatus. The evaporator-blower section is desirably contained in its own housing, and such housing preferably includes access panels which permit access from outside the trailer, so that the unit can be serviced without disturbing the cargo.

The evaporator-blower section and the power section are desirably built as self-contained units, which are connected by means of a conduit assembly which includes for each of the dual refrigeration systems a condensed-refrigerant line, a return line for the cooling cycle, and a hot gas line for the heating cycle. The conduit assembly is desirably connected to the power unit and to the evaporator-blower unit through valved releasable connections, for this permits the units to be completed and fully charged at the factory and installed as such, and provides that either section may be disconnected for servicing. The only other connections required between the two units are a three-wire line for the heater and blower, and a suitable thermostat line for each of the dual systems.

The prime mover engine is adapted to operate continuously, either at idling speed or at governed power speed, in accordance with the demands of the system. A master control switch converts the dual systems from cooling to heating operation. Each system includes a thermostat, as in the return air to the blower, operating to control both the cooling function and the heating function. These act independently, and each controls the electric clutch connecting the compressor of its system to the engine, and concurrently activates the engine control device for raising the engine speed from idling speed to governed power speed. Operation of the compressor at such power speed automatically actuates the cooling cycle of the driven system. As a result of the increase in speed of the prime mover from idling speed to governed power speed, the generator driven by the prime mover is driven at generating speed, and drives the blower motor at blowing speed. When the master switch is turned to the heating position, the generator is connected not only to the motor but also to the heater of the evaporator-blower unit, and is connected to actuate solenoid valves in that section which admits hot gas direct from the compressors to the evaporator coils, so that the evaporator of each active system then becomes a heating coil.

Defrosting during the cooling operation is desirably effected automatically by a suitable timer and may also be effected manually. To effect defrosting, the generator power line is automatically disconnected from the blower motor and is connected instead to the heater and to the solenoid valves, so that the blower is stopped and the evaporator coils are heated both from the electric resistance heater and by supplying to such coils hot gas direct from the compressor of the system.

The accompanying drawings illustrate the invention. In such drawings:

FIG. 1 is a side elevation of a semi-trailer equipped with the refrigeration apparatus embodying the invention, with part of the side wall broken away to show the evaporator-blower installation;

FIG. 2 is a longitudinal section of the evaporator-blower unit of the refrigeration apparatus shown in FIG. 1;

FIG. 3 is an alternative mounting of the unit shown in FIG. 1, mounted from inside the trailer rather than from outside;

FIG. 4 is a front elevation of the removable motor and blower assembly of the evaporator blower unit;

FIG. 5 is a plan view of the power unit;

FIG. 6 is a side elevation of the power unit;

3

FIG. 7 is a rear elevation of the power unit;

FIG. 8 is a diagrammatic view of the refrigeration and heating apparatus; and

FIG. 9 is an electrical diagram.

In the installation shown in FIG. 1, a conventional semi-trailer 10 having suitably insulated walls 12 is equipped with refrigeration apparatus embodying the invention. A power unit 14 is mounted beneath the body of the trailer, directly from the frame of the trailer. This comprises a suitable frame enclosed with protective side panels and screens such as the side panel 16 and the screen 18 shown in FIG. 1. It also includes a control panel covered by a cover plate 20. A fuel tank 22 for the prime mover of the power unit 14 is separately mounted beneath the body of the truck 10.

The front wall 24 of the trailer 10 is provided with an opening of conventional size, surrounded by a mounting flange, and an evaporator-blower unit 30 is mounted in such opening. This comprises a suitable frame enclosed by sidewalls and provided with a side access panel 32 removable from within the truck and a front cover plate 34 removable from outside the truck. A blower and motor assembly 36 is mounted in depending position from the unit 30 and is separately removable through the unit 30 as will appear. Such blower assembly discharges to the interior of the evaporator unit 30, and such unit is provided with a discharge nozzle 38 which discharges rearwardly along the ceiling of the trailer body 10. It may be connected to a distribution duct if desired.

As seen in FIGS. 2 and 4, the blower assembly 36 comprises two blowers 40 mounted in spaced relation on a supporting frame 42, with their common motor 44 mounted between them. The motor shaft 46 extends in opposite direction from the motor and is connected at its ends to drive the blower wheels of the blowers 40. In the path of the intake air to the blowers 40 there are two thermostat bulbs 50 for sensing the temperature of the return air to the evaporator unit, respectively connected, as by capillary tubes 49 to control the thermostats 51 for the two refrigeration systems of the dual installation. The blower assembly 36 is dropped through an opening in the bottom wall of the evaporator unit 30 and is supported by its frame 42 from the bottom structural members of such unit 30. Desirably, a pair of guard rails 52 are mounted from the front wall of the trailer body in position to protect the blower unit from damage, and to keep clear a free air-return path to the blowers. As has been noted, the refrigeration apparatus includes two dual refrigeration systems, which are made up of identical elements. The two systems will be designated as system A and system B, and their corresponding parts will be given the same reference numerals and will be distinguished when necessary by the postscript letters "*a*" and "*b*."

As is seen in FIG. 2, the evaporator unit 30 contains a bank of evaporator coils forming an upper evaporator 60*a* and a lower evaporator 60*b*. These are mounted in and above a drain pan 62 which contains an A.C. resistance heater 64 of a suitable waterproof character. The two evaporator coils have similar connections. Those for the coil 60*a* are shown in FIG. 2. These include a refrigerant supply line 66 desirably containing a filter and dryer 68 and connected to temperature controlled expansion valve 70 which feeds to a distributor head 72 directly connected to the coils of the evaporator 60*a* in a conventional manner. The lower end of the coil leads to a return line 74 which lies in contact with a temperature sensing bulb 76 for the temperature responsive valve 70. In addition to the lines 66 and 74, a hot gas line 78 containing a normally closed solenoid valve 80 is connected to the system at a point between the temperature responsive valve 70 and the distributor head 72. The evaporator lines 66, 74, and 78 contain manual valves 67, 75, and 79, connected through releasable connections 82, 83, and 84 to the three conduits of an insulated conduit assembly 28 leading from the power unit 14.

4

It is to be noted that all of these elements are accessible from outside the trailer body, through the opening covered by the removable cover plate 34.

In FIG. 3, the evaporator unit 30 is shown in an alternative mounting, in which it is bolted against the inner face of the front wall 35 of a truck body 11. In this instance the mounting is wholly from the inside of the truck body 11 and there is no opening through the front wall 35. While such an inside mounting is feasible, and is an advantageous feature of the apparatus, the mounting of FIG. 2 is preferred.

The power unit 14 is more fully shown in FIGS. 5, 6 and 7. It comprises a suitable frame 82 provided with mounting brackets 84 for mounting on the frame of the trailer. It contains a prime mover which may be any of various internal combustion engines available on the market. At shown, the engine 90 is a 2-cylinder gasoline engine of extremely reliable characteristics. It has a governor-controlled carburetor 92 supplied with gasoline from an electric fuel pump 94. The carburetor is controlled by a solenoid 96 which in de-energized position allows the engine 90 to run at idling speed and in energized position accelerates the engine 90 to its governed power speed, for example, 2600 r.p.m., and maintains it at such speed. The control of such solenoid 96 will be discussed in connection with the electrical diagram of FIG. 9. Ignition for the engine is provided by a magneto 98, not identified in FIGS. 5–7. The engine is provided in conventional manner with an electric starter 100, also not shown in FIGS. 5–7.

The engine has a rearwardly extending output shaft 102 which carries two pulleys, one, a single pulley 104 connected by a belt to drive a D.C. generator 106 for charging the battery 108 of the system, and the other, a double pulley 110 connected by belts to drive an A.C. generator 112. A forwardly extending output shaft 114 on the engine 90 carries a fan 116 and two single-groove pulleys 118. Such pulleys 118 are respectively engaged by belts for driving the compressors 120*a* and 120*b* of the two refrigeration systems A and B. For such driving connection, the belts 119 from the pulleys 118 are engaged in pulleys 122 loosely mounted on the shafts of the compressors 120, and such loosely mounted pulleys 122 are arranged to be clutched to the compressor shafts by means of electric clutches 124.

In the power unit, each refrigeration system comprises a return line 126 leading directly to an accumulator 128 which in turn is connected to a compressor 120. The compressor 120 discharges through a pipe 130 to a condenser section 132, the bottom of which is connected by a drain 134 to a receiver tank 135. This in turn is connected at its bottom to a refrigerant line 136. A branch 131 from the compressor discharge line 130 connects through a check valve 138 to a hot gas line 140.

As will be seen in FIG. 6, the condenser 132*a* of the refrigeration system A is disposed below the condenser 132*b* of the refrigeration system B, and both lie in a position to be cooled by the fan 116 on the motor shaft 114.

The refrigeration lines 126, 136 and 140 of the power unit contain manual valves 139 and are connected to the conduit assembly 28 by releasable connections 127, 137 and 141. As indicated in FIG. 6, the three conduits of the conduit assembly 28 are enclosed within a common insulating and protective cover, and are desirably in heat conductive contact with each other. Desirably, the refrigerant line and the return line are soldered to each other over their entire length, to insure heat transfer relationship.

The refrigeration systems described above are shown in diagrammatic form in FIG. 8, where the parts are numbered as set forth above and where certain components of the two systems A and B are distinguished by the postscript letters "*a*" and "*b*." As is seen in FIG. 8, the heater 64 of the evaporator unit is connected to the wires 142 and 143 of a three wire cable, and the blower motor 44 is connected to the wires 143 and 144 of such cable. The solenoids of the solenoid valves 80a and 80b of the hot gas lines 78a and 78b are connected in parallel with each other and with the heater 64 across the circuit formed by the wires 142 and 143.

In the electrical diagram of FIG. 9, the upper portion shows the direct current system associated with the prime mover. This includes a three position main switch 150 having a grounded switch arm 152 and a hot switch arm 154 connected through the ammeter 156 and a fuse 158 to the battery 108. In the off position of the switch, the hot switch arm 154 is in open position while the grounded switch arm 152 is connected to the ground wire 99 of the magneto of the engine 90, to render that engine inoperative. In the start position, the ground arm 152 is connected to one side of the circuit for the electrical fuel pump 94, the other side of such circuit being connected through a wire 160 to the hot terminal of the ammeter 156. Also in such start position, the hot switch arm 154 is connected through a wire 162 to the actuating coil of a starter relay 164, to close the starter relay switch and connect the starter to the battery 108.

In the run position of the switch 150, the ground arm 152 is again connected to a contact which closes the circuit of the fuel pump 94. In such run position, the hot switch arm 154 is connected to a D.C. control line 166 which leads to two relay switches 168 and 170 by which that D.C. control line may be connected to a wire 172 leading to the control solenoid 96 of the carburetor governor.

During power operation of the engine 90, its D.C. generator 106 acts through a regulator 107 to charge the battery through the line 160.

The D.C. control line 166 also leads by way of a branch line 174 to the D.C. side of a master switch 180 which has a cooling position and a heating position. The two thermostats 51a and 51b controlled by the sensing bulbs 50 in the return air entering the blower 40 of the evaporator blower unit 30 are dual-action thermostats, to control both cooling and heating. Desirably they are adjustable to vary the cooling and temperatures independently. In cooling operation, the cooling-control switches of the two thermostats 51 are energized from a terminal 182 of the master switch 180, and are connected in parallel with each other by a wire 184. For heating operation, the heating-control switches of the thermostats are energized in parallel from a terminal 186 of the master switch 180, by a wire 188. Each thermostat has a single output wire 190, which desirably contains a manually controlled switch 192 and which leads to the actuating coil for one of the relay switches 168 and 170 for the speed control solenoid. The thermostats are also respectively connected, by extension lines 194, to the electric clutches 124 which, when energized, connect their associated compressors 120 to the engine 90.

The A.C. generator 112 has an output circuit comprising the wires 200 and 202, at least one of which contains a fuse 204. Desirably, the A.C. output circuit is connected to a volt meter 206 and to a time meter 208 by which the hours of operation of the prime mover at driving speed can be recorded.

The output line 202 of the A.C. generator is connected to a center terminal 210 on the A.C. side of the main control switch 180. When such switch is in cooling position, this terminal is connected to an output terminal 212 connected by a wire 214 to a defrosting timer 216. This contains a normally open switch 218 which is periodically closed by a timer motor 220, and when such switch 218 is closed it energizes the actuating coil 222 of a two position relay controlling a switch arm 228. A by-pass circuit 224 containing a manual switch 226 provides for manual defrosting in addition to the automatic defrosting provided by the timer 216. In the two position relay, the switch arm 228 normally lies in contact with a terminal 230 connected to the motor wire 144 of the three wire cable. During defrosting, the switch arm 228 moves away from such terminal 230 to open the motor circuit, and moves into contact with a heater terminal 232, connected to the heater wire 142 of the three wire cable. The common wire 143 of such cable is connected to the opposite side of the A.C. generator, through the wire 200.

When the master switch 180 is in heating position, the A.C. input terminal 210 is connected to a terminal 234 which is connected by a wire 236 direct to the heater wire 142 of the three wire cable.

Operation is as follows:

When the system is to be put into operation, either for cooling or heating, the three position engine-controlled switch 150 is actuated first to the start position to energize the fuel pump and the starter, and is held in such position until the engine starts. It is then turned to the run position, where it energizes the fuel pump and the D.C. control line 166. Manual choking means is provided, and it is assumed that the engine is properly started and is in stable running condition. It is further assumed that the speed solenoid is de-energized, and that the engine is running at idling speed. Under these conditions, the A.C. generator has no significant output, and the blower motor which is normally connected to it will be inoperative.

Assume now that the master control switch 180 is turned to its cooling position. The two thermostats 51a and 51b responsive to the temperature of the return air to the blowers 40 will normally be set to respond to different temperatures, so that a mild cooling or heating demand will energize one of the two dual systems whereas a greater cooling or heating demand will energize both systems. Under initial operating conditions, it is assumed that both thermostats will call for cooling. Accordingly, a D.C. circuit will be completed from the D.C. control line 166 through the master switch 180 and its terminal 182 to the thermostats 51a and 51b, and from them through their output lines 190 to the control windings for the relay switches 168 and 170. Either or both of these will energize the speed control solenoid 96 to set the governed carburetor of the engine 90 for working speed, and the engine will accelerate to that speed. Simultaneously, the D.C. control circuit will be completed through the extensions 194 to the electric clutches 124a and 124b of the two compressors of the two refrigerating systems A and B, and both such systems will be put into operation by the actuation of their compressors.

In each system, the compressor will discharge compressed refrigerant to the condenser 132, and condensed refrigerant will flow to the receiver 135 and from thence to the refrigerant line 136. The condensed refrigerant will be conveyed through the connected conduit of the conduit assembly 28 to the refrigerant line 66 of the evaporator unit, where it will pass through the dryer 68 and the temperature responsive valve 70 to the evaporator 60. Here its expansion will produce cooling and the cooled refrigerant will flow to the return line 74 and its connected return conduit in the conduit assembly 28. Back at the power unit, the return refrigerant will flow through the return line 126 to the accumulator 128 and from this will be picked up again by the compressor 120.

When the engine 90 is accelerated to its operating speed, it will drive the A.C. generator at its generating speed and the A.C. output will be carried by the lines 200 and 202 through the switch 228—230 to energize the motor circuit 143—144 of the three wire cable. This will actuate the blower motor 44 and drive the blowers 40 to circulate air through the evaporator coils and the trailer body.

When a defrost cycle is initiated either by the closing of the automatic timer switch 216 or by the manual switch 226, an A.C. circuit will be closed through the terminals 210 and 212 of the master switch 180 and the defrost switch 218 or 226 to the actuating coil 222 of the two-position relay switch 228. This will open the motor circuit at the switch contact 230 and will close the circuit to the heater contact 232. This will energize the heater circuit 142—143 of the three-wire cable, and at the evaporator unit, this will not only energize the resistance heater 64 but will also open both of the solenoid valves 80a and 80b. The opening of such valves will open the hot gas lines direct from the compressors 120a and 120b to the connected evaporator coils 60a and 60b. The flow of hot gas to those coils and the heat output of the resistance element 64 will quickly defrost the evaporator, allowing the melted water to drain to the drain pan 62 and out its drain opening. Upon completion of the defrost cycle, the two-position relay coil 222 will be de-energized, and the relay switch arm 228 will again move to its normal position, where it will close the motor circuit and open the heater circuit. Cooling operation will then continue until demand is satisfied as sensed by one or both of the thermostats 51a and 51b. Upon the opening of both such thermostats, the D.C. control circuit will be broken, to de-energize the electric clutches 124a and 124b and thereby disconnect the compressors from the engine 90 and terminate the cooling operation of the refrigeration apparatus. The breaking of the D.C. control circuit will also de-energize the relay switches 168 and 170 and open those switches, and this will de-energize the speed control solenoid 96 and return the engine to idling condition.

For heating operation, the master control switch 180 is turned to its heating position. This will connect the D.C. control line to the output terminal 186 of such master switch 180, and this will energize the heat-control sides of the thermostats 51a and 51b. If one of such thermostats is calling for heat, this will close a circuit to its output line 190, and the energization of such output line will have the same result as before. That is, it will energize an electric clutch 124a or 124b and will close one of the relay switches 168 and 170. The closed relay switch will energize the speed control solenoid 96 to speed up the engine to its operating speed, and this will drive the A.C. generator at its operating speed. The main switch, in heating position, will open the circuit to the defroster control switches, so that the relay switch 228—232 will remain in normal position, closing a circuit to the motor for the blowers 40, and such blowers will be driven in response to A.C. generator operation. Concurrently, an A.C. circuit will be established through the main switch 180 to its output terminal 234 and the wire 236, to energize the heater circuit 142—143 of the three wire cable. At the evaporator section, this will energize the resistance heater unit 64, and will open both the solenoid switches 80a and 80b in the hot gas lines of the two refrigeration systems. Accordingly, heat will be supplied at the evaporator both from the resistance unit 64 and from the hot gas pumped to the evaporator coils by the compressors 120, to heat the air circulated through the evaporator and the trailer body by the blowers 40.

The apparatus described will be entirely self-contained, and will be operative whether the trailer on which it is mounted is in transit or in storage.

I claim as my invention:

1. Temperature-conditioned transport means, comprising a transport vehicle such as a semi-trailer having a walled transport body adapted to be held at regulated temperature, a power unit mounted from the frame structure of such vehicle outside said transport body, and a heat exchange unit mounted on a wall of said body in remote relation with said power unit, said power unit comprising a self-contained prime-mover and a governor governing the same for operation at idling speed and at working speed, dual refrigeration systems respectively including two compressors included in said power unit and connected through normally disengaged electric clutches for operation by said prime mover, said systems also including condensers included in said power units and cooled by fan means driven by said prime mover, a battery included in said power unit, electric generating means for charginng said battery and including a power-output generator driven by said prime mover, said heat exchange unit including evaporators for said refrigeration systems and including blower means for circulating air through said evaporators and said body, said blower means being driven by electric motor means connected for operation by said power-output generator when driven by said prime mover at working speed, conduit means interconnecting those parts of each refrigeration system included in the heat-exchange unit with those parts included in the power unit, and thermostat means for controlling said dual refrigeration systems in response to temperature conditions in said body, and electrical means connecting said thermostat means to close power circuits from said battery to energize respectively the clutches between said prime mover and said compressors, and actuate said governor concurrently with the energization of any one of said clutches for accelerating said prime mover from idling to working speed, whereby said prime mover will actuate the refrigeration system of each energized clutch and will concurrently drive said power-output generator to energize said blower motor and drive said blower means to circulate air through the evaporator and said body.

2. Temperature-conditioned transport means as set forth in claim 1 in which said thermostat means includes independently adjustable means to vary the body temperature to which the respective systems respond.

3. Temperature-conditioned transport means as set forth in claim 1 with the addition that said heat exchange unit comprises a frame supporting and enclosing said evaporators and supporting said blower means, said cargo body wall having a mounting opening therethrough and said frame being mounted through said opening from outside said body and projecting inward of said wall, said blower forming part of a sub-assembly mounted in a side wall of said frame to project laterally of the wall opening, and said sub-assembly being removable from inside said frame and through the wall opening, and a removable cover for closing said body wall opening and said exchange unit.

4. Temperature-conditioned transport means as set forth in claim 1, with the addition that a wall of said body is provided with a mounting opening and that said heat exchange unit comprises a frame supporting and enclosing said evaporators, said frame being mounted through said opening to project into the cargo space of said body, the outer face of said frame being open to provide service access to said heat exchange unit from outside the body, and a cover for closing said body wall opening and the access opening of said unit.

5. Temperature-conditioning apparatus for a semi-trailer or the like having a walled body, comprising a power unit having a frame and means to mount the unit to the frame structure of the semi-trailer, and a heat exchange unit having a frame and means to mount the same in a position independent of said power unit and in heat exchange relation with space in said body, said power unit comprising a prime mover having governor means normally operating the same at idling speed and actuatable to operate the same at working speed, dual refrigeration systems respectively including two compressors in said power unit and connected through normally-disengaged electric clutches for operation by said prime mover, said systems also including condensers in said power unit, a battery and electrical means including battery-charging means and a power-output generator connected to be driven by said prime mover, said heat-exchange unit including evaporators for said refrigeration systems and including blower means for circulating air through said evaporators and the semi-trailer body, and blower motor means adapted to be energized from said power-output generator when such generator is driven by said prime mover at working speed, conduit means for interconnecting those parts of each system included in the heat exchange unit with those parts included in the power unit, thermostat means responsive to the temperature of the air circulated by said blower means, and first electrical means connected to close power circuits from said battery to energize said clutches and to actuate said governor means to accelerate said prime mover to working speed, said thermostat and first electrical means including control means to control whether one or both said clutches are energized under predetermined conditions, and second electrical means for energizing said blower-motor means from said power output generator when such generator is driven by said prime mover at working speed.

6. Temperature-conditioning apparatus according to claim 5 with the addition that said control means comprises means to relatively adjust the temperatures at which the power circuits for the two clutches are closed.

7. Temperature-conditioning apparatus for a semi-trailer or the like having a walled body, comprising a power unit having a frame and means to mount the same to the frame structure of the semi-trailer outside said body, and a heat exchange unit having a frame and means to mount the same in the body of the semi-trailer in a position remote from said power unit, said power unit comprising a prime mover having governor means normally operating the same at idling speed and actuatable to operate the same at working speed, a refrigeration system comprising a compressor included in said power unit and connected through a normally disengaged electrical clutch for operation by said prime mover, and a condenser included in said power unit and cooled by fan means driven by said prime mover, a battery, electrical means including means for charging said battery and a power-output generator connected to be driven by said prime mover, said heat exchange unit including an evaporator for said refrigeration system, a blower for circulating air through said evaporator and the semi-trailer body, and a blower motor adapted to be energized from said power-output generator when driven by said prime mover at working speed, conduit means for interconnecting those parts of said refrigeration system included in the heat exchange unit with those parts included in the power unit, thermostat means responsive to the temperature of the air circulated by said blower, first electrical means for connecting said thermostat means to close a power circuit from said battery to energize said clutch and to actuate said governor means to accelerate said prime mover to working speed, and second electric means for energizing said blower motor from said power output generator when driven by said prime mover at working speed.

8. Temperature-conditioning apparatus according to claim 7 with the addition of a conduit for delivering hot gas direct from said compressor to said evaporator, a solenoid valve controlling said conduit, an electric heater in said heat exchange unit, and electrical connector means for connecting said power output generator to energize said heater and solenoid valve to convert said heat exchange unit from a refrigerating unit to a heating unit.

9. Temperature-conditioning apparatus according to claim 8 with the addition that said thermostat means includes means for closing said power circuit in response to cooling demand, means for rendering said last named means inoperative, and means for closing said power circuit in response to heating demand when said electrical connector means is operative to connect the power output generator to energize said heater and solenoid.

10. Temperature-conditioning apparatus according to claim 7 with the addition of heater means in said heat exchange unit and a heater circuit for actuating said heater means, a defrost circuit and a relay controlled thereby for disconnecting said blower motor means from said output generator and connecting said heater circuit thereto, in combination with a main switch means having cooling and heating positions, said switch means in cooling position connecting said thermostat means to control said power circuit in response to cooling demand and connecting said defrost circuit to a power source, and said switch means in heating position rendering said thermostat means inoperative to control said power circuit in response to cooling demand, disconnecting said defrost circuit from its power source, and connecting said output generator to said heater circuit in parallel with said blower motor means.

11. Temperature-conditioning apparatus for a semi-trailer or the like, having a walled body, comprising an evaporator unit having a frame adapted to be inserted through a close-fitting opening in a wall of said body and to be secured therein in a position projecting inwardly of the wall, means closing the sides of said unit and defining a discharge opening and a blower opening, a blower assembly including means removably mounted in said blower opening from inside said frame to close said blower opening and including blower means projecting outward from said evaporator unit into the body space, said blower assembly comprising a blower and blower motor for blowing air from outside said unit through the same and out the discharge opening thereof, heat exchange means in the path of air through the heat exchange unit, and a power unit adapted to be carried by the semi-trailer for energizing said heat exchange means and motor.

12. In combination with a transport vehicle such as a semi-trailer having a walled body enclosing a cargo space, a wall of said body being provided with a heat exchanger opening, a heat exchange unit comprising a frame and wall means supporting and enclosing an evaporator and blower means for circulating air through the heat exchange unit and the cargo space, said heat exchange unit having an access opening and being mounted to the said wall of said body with the access opening of said unit in registry with the opening of said wall, cover means removably mounted from outside said body for closing said access opening, said cover means and unit serving to close said body wall opening, and a power unit for said heat exchange unit mounted on said body independently of said heat exchange unit and remote from said access opening, said power unit comprising a prime mover, a compressor and a condenser, and means for connecting said compressor and condenser in a refrigerant system including the evaporator of said heat exchange unit, said heat exchange unit being mounted through said body wall opening from outside said body with the access opening of said unit facing outside said body, and said blower means comprising an assembly mounted in a wall of said heat exchange and projecting laterally of said body wall opening, said assembly being removable through said access opening by passing the same inward into the unit and out through the access opening.

References Cited in the file of this patent
UNITED STATES PATENTS

| | | |
|---|---|---|
| 2,303,857 | Numero | Dec. 1, 1942 |
| 2,336,735 | Jones | Dec. 14, 1943 |
| 2,346,017 | Errath | Apr. 4, 1944 |
| 2,660,865 | Durant | Dec. 1, 1953 |
| 2,722,106 | Henney | Nov. 1, 1955 |
| 2,735,277 | Clark | Feb. 21, 1956 |
| 2,793,834 | Henney | May 28, 1957 |
| 2,807,147 | Jacobs | Sept. 24, 1957 |

UNITED STATES PATENT OFFICE
CERTIFICATE OF CORRECTION

Patent No. 3,100,384                                      August 13, 1963

Ralph S. Lowensohn

It is hereby certified that error appears in the above numbered patent requiring correction and that the said Letters Patent should read as corrected below.

In the grant (only), line 1, for "Ralph S. Lowensoh" read -- Ralph S. Lowensohn --; column 7, line 75, for "charginng" read -- charging --.

Signed and sealed this 25th day of February 1964.

(SEAL)
Attest:
ERNEST W. SWIDER                                  EDWIN L. REYNOLDS Attesting Officer                                Acting Commissioner of Patents